Dec. 18, 1928.
J. L. HOGLAND
1,695,491
VEHICLE BODY
Filed Feb. 3, 1928
2 Sheets-Sheet 2
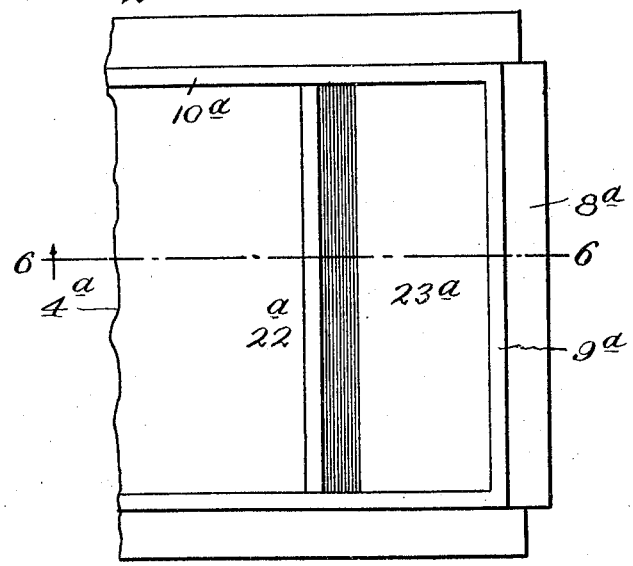
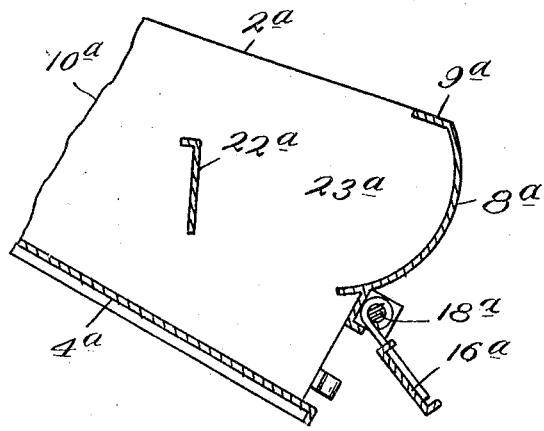
Inventor:
Joseph L. Hogland,
By F. G. Fischer,
Attorney.
Witness:
Fred C. Fischer Patented Dec. 18, 1928.

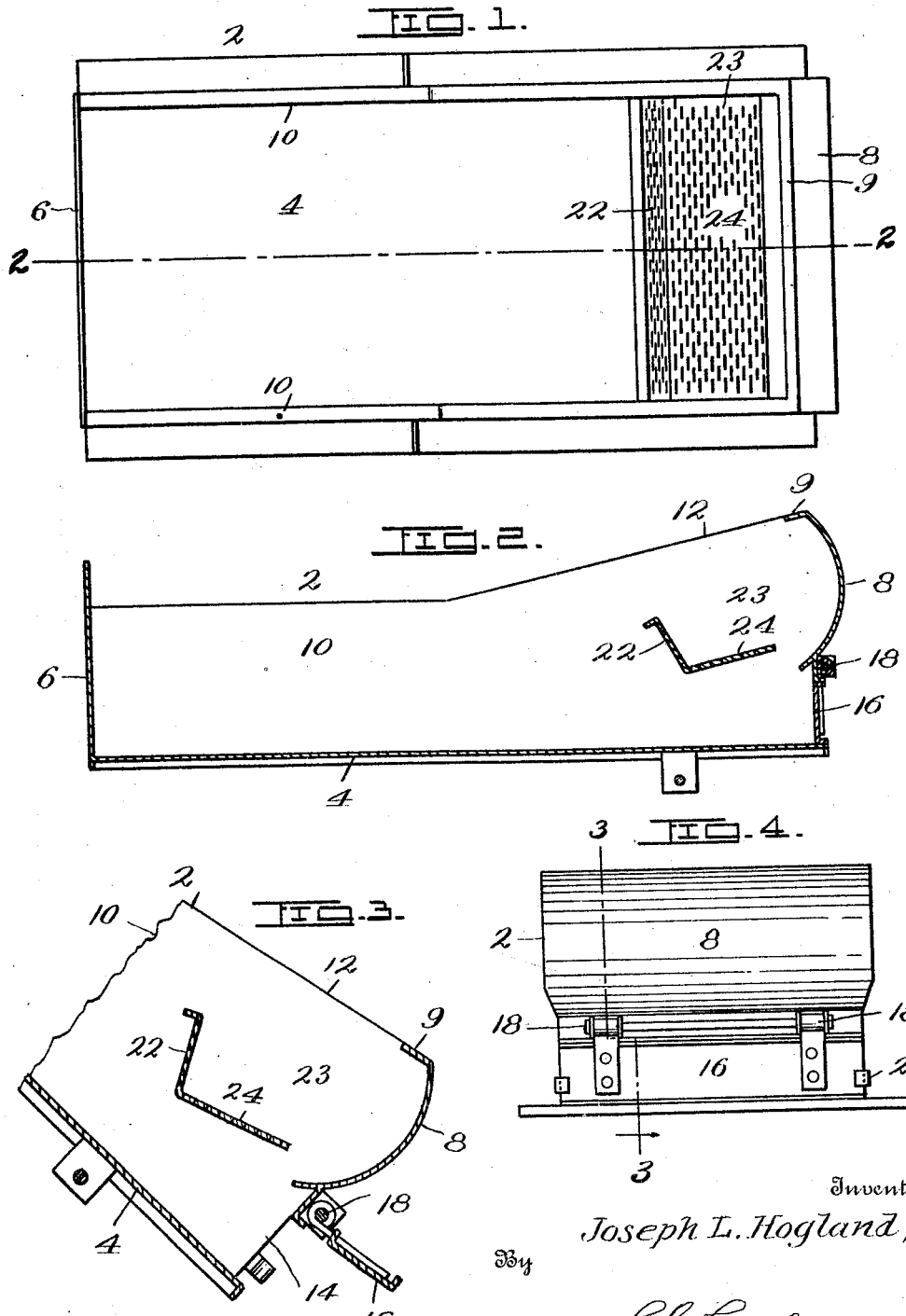

1,695,491

UNITED STATES PATENT OFFICE.

JOSEPH L. HOGLAND, OF KANSAS CITY, MISSOURI, ASSIGNOR OF ONE-HALF TO HARRY P. THOMSON, OF KANSAS CITY, MISSOURI.

VEHICLE BODY.

Application filed February 3, 1928. Serial No. 251,605.

My invention relates to a vehicle body for transporting mortar, concrete, and similar compositions from a central mixing plant to the place of use, and my object is to provide a vehicle body which will automatically remix the fluid constituents with the solid constituents as the composition is dumped from said vehicle body at the point of use.

The business of preparing concrete and other compositions at a central plant for delivery to various points of use by motor trucks is growing into a large industry, but one objection is that during transportation of the mixture the heavy constituents such as gravel and broken rock settle to the bottom while the water and cement, forming the richest portion of the mixture, arise to the top and are discharged first as the vehicle body is adjusted to a dumping position, instead of being mixed with the rock or gravel constituent as is necessary to obtain the best results.

By the use of my vehicle body the foregoing objection is overcome, and in order that the invention may be fully understood reference will now be had to the accompanying drawing, in which:

Fig. 1 is a plan view of a vehicle body equipped with my invention.

Fig. 2 is a longitudinal section on line 2—2 of Fig. 1.

Fig. 3 is a broken sectional view on line 3—3 of Fig. 4, showing the rear portion of the vehicle body in tilted or dumping position.

Fig. 4 is a rear elevation of the vehicle body.

Fig. 5 is a broken plan view of the rear portion of the vehicle body equipped with a modified form of the invention.

Fig. 6 is a section on line 6—6 of Fig. 5, with the body in a tilted position.

Referring more particularly to the form disclosed by Figs. 1 to 4, inclusive, 2 designates a vehicle body which is preferably made of sheet metal of water-tight construction, so that the fluid content of the mixture cannot leak out during transportation from a central plant. Said body 2 consists of a bottom 4, a front 6, a convex rear end 8 terminating at its upper margin in a forwardly projecting flange 9, and a pair of longitudinal sides 10 which are connected to the bottom 4 and the front and rear ends 6 and 8, respectively. The flange 9 prevents the fluid constituents of the mixture from running over the upper edge of the rear end 8 when the body is tilted to dump the mixture. At a point about midway their ends, the upper edges of the two sides 10 slope upwardly and rearwardly to the flange 9, as indicated at 12, to prevent the mixture from running over said edges when the body 2 is tilted to a dumping position. The lower margin of the rear end 8 of the body 2 is spaced a suitable distance above the bottom 4 to leave a discharge opening 14, which is normally closed by a tailgate 16 mounted upon hinges 18 and which may be normally held in closed position by any conventional fastening means. In the drawings I have shown resilient fastening devices 20.

22 designates a baffle which is arranged intermediate the upper and lower margins of the sides 10 to which it is firmly secured. Said baffle 22 is disposed a suitable distance in advance of the rear end 8 to coact with the latter in forming a hopper 23 and as shown by Figs. 2 and 3, is perforated or slotted and connected at its lower end to a rearwardly projecting perforated apron 24.

In practice the body 2 may be mounted upon any conventional running gear, such as a motor truck chassis equipped with the usual mechanism for tilting the body to the dumping position shown by Figs. 3 and 6. When a load of concrete is to be transported to a point of use the body 2, including the hopper 23, is loaded at the central plant to a point approximately level with the top of the baffle 22. During transportation the solid constitutents such as rock, or gravel, settle to the bottom while the cement and water rise to the top of the mixture and under ordinary circumstances would flow out first into the concrete forms previously prepared when the body 2 is tilted to dumping position. However, when the body 2 is equipped with my invention and tilted to dumping position the major portion of the solid constituents will pass out beneath the apron 22 and the baffle 24 while the cement and water will be retarded by the baffle 22 and apron 24 over and through the slotted portions of which the cement and water will flow, and thus be uniformly distributed upon and remixed with the rock or gravel in its passage to the discharge opening 14. The remixing operation is also aided by the convex rear end 8, the curvature of which directs a portion of the cement and water forwardly and downwardly against the rock or gravel in its passage to the discharge opening 14. By thus retarding and distributing the fluid content of the concrete uniformly upon the solid content it is apparent that the constituents are thoroughly remixed when dumped, and hence after the concrete has been poured into forms or spread out to form a sidewalk or drive-way it will have greater strength than if the fluid content were permitted to dump first.

In the simplified form disclosed by Figs. 5 and 6 the construction is somewhat similar to the form disclosed by Figs. 1 to 4, inclusive, as is evidenced by corresponding reference numerals with exponents $a$, the main difference being that the baffle $22^a$ is imperforate and the apron 24 is dispensed with.

While I have shown and described two forms of my invention I reserve all rights to such other forms and modifications thereof as properly fall within the spirit and scope of the invention as claimed.

Having thus described my invention, what I claim and desire to secure by Letters Patent, is:

1. In combination, a vehicle body adapted to carry and discharge a previously mixed composition, and means extending entirely across said body for remixing the composition during the discharging operation.

2. In combination, a vehicle body adapted to carry and dump a previously mixed composition, baffle means arranged within said body for remixing the composition during the dumping operation, and an apron coacting with said baffle means in remixing the composition.

3. In combination, a vehicle body adapted to carry and dump a previously mixed composition, and a baffle extending across the inner rear portion of said body and spaced above the bottom of the latter for remixing the composition during the dumping operation.

4. In combination, a vehicle body adapted to carry and dump a previously mixed composition, a baffle extending across the inner rear portion of said body and spaced above the bottom of the latter for remixing the composition during the dumping operation, and an apron extending rearwardly from said baffle.

5. In combination, a vehicle body adapted to carry and dump a previously mixed composition, and a perforated baffle extending across the inner rear portion of said body intermediate the top and bottom thereof for remixing the composition during the dumping operation.

6. In combination, a vehicle body adapted to carry and dump a previously mixed composition, a baffle extending across the inner rear portion of said body intermediate the top and bottom thereof for remixing the composition during the dumping operation, and a perforated apron extending rearwardly from the lower portion of said baffle.

7. In a vehicle body adapted to carry and dump a mixture and consisting of a bottom, a front end secured in said bottom, a convex rear end spaced above said bottom to leave a discharge opening, a tail-gate operably connected to the rear end of the body and adapted to close said discharge opening, and sides connected to said front and rear ends and having their upper margins inclined upwardly from their intermediate to their rear ends, in combination with remixing means carried by said body for coacting with the convex rear end in remixing the mixture as the latter is dumped from the body.

In testimony whereof I affix my signature.

JOSEPH L. HOGLAND.